United States Patent [19]

Kim

[11] Patent Number: 5,686,800
[45] Date of Patent: Nov. 11, 1997

[54] IMAGE-CORRECTION CIRCUIT AND METHOD FOR PICTURE TUBE

[75] Inventor: Young-hee Kim, Suwon, Rep. of Korea

[73] Assignee: Samsung Electronics Co., Ltd., Suwon, Rep. of Korea

[21] Appl. No.: 445,182

[22] Filed: May 19, 1995

[30] Foreign Application Priority Data

May 19, 1994 [KR] Rep. of Korea ............... 94-10861

[51] Int. Cl.$^6$ ................................................. H01J 29/56
[52] U.S. Cl. .................... 315/371; 348/583; 348/746; 348/806
[58] Field of Search .................. 315/370, 371; 348/583, 746, 806

[56] References Cited

U.S. PATENT DOCUMENTS

| | | | |
|---|---|---|---|
| 5,298,985 | 3/1994 | Tsujihara et al. | 348/745 |
| 5,355,058 | 10/1994 | Jackson et al. | 315/371 |
| 5,434,484 | 7/1995 | Murakami | 315/371 |
| 5,483,260 | 1/1996 | Parks et al. | 345/156 |

*Primary Examiner*—Theodore M. Blum
*Attorney, Agent, or Firm*—Ladas & Parry

[57] ABSTRACT

An image-correction circuit and method for a picture tube is disclosed including system control means for determining the rotation degree of vertical and horizontal sync signals, and outputting vertical and horizontal charging/discharging control signals and vertical and horizontal phase signals; vertical phase control means for outputting a vertical phase control signal; horizontal phase control means for outputting a horizontal phase control signal; vertical phase sync means for shifting the image vertically thereby correcting the vertical position of the image; and horizontal phase sync means for receiving the horizontal phase control signal and shifting the image horizontally thereby correcting the horizontal position of the image.

19 Claims, 7 Drawing Sheets

IMAGE-CORRECTION CIRCUIT AND METHOD FOR PICTURE TUBE

BACKGROUND OF THE INVENTION

The present invention relates to an image-correction circuit and method for a picture tube, and more particularly, to an image-correction circuit and method for a picture tube in which an image rotation is corrected in a circuitry configuration, and an image which becomes asymmetric vertically and horizontally or non-rectangular when displayed is corrected using data previously stored in a memory.

Generally, a picture tube for displaying images has an electron gun for emitting an electron beam projected onto the screen. The emitted electron beam is deflected horizontally and projected onto the screen. An image is formed according to the density of the projected electron beam. The electron beam is deflected by the electromagnetic field formed by the deflection coil so that the deflection angle of the electron beam may be deformed if the electromagnetic field is affected by the outer disturbance.

Especially, the terrestrial magnetic field interrupts the track of the electron beam and varies the landing position thereof. As a result, an image rotation is produced as shown in FIG. 1.

A picture tube 6 is fixed to a chassis 4 of a display 2. When deflected normally, an image is displayed to be fitted on screen 8. However, when the outer magnetic field affects it, rotated image 8a is displayed in FIG. 1.

Due to this problem, careful consideration must be involved in design of deflection coil and neck components in order to minimize the effect of the terrestrial magnetic field with respect to the picture tube of the display.

For a specific countermeasure, the deflection yoke is rotated manually with respect to the image displayed to compensate for the image rotation caused due to the outer magnetic field. In addition, the picture tube may be shielded. The former method requires experienced skill. Further, in order to rotate the picture tube, the whole set must be disassembled. The latter method involves a lot of economic burden and large chassis or housing in shielding the picture tube.

In order to overcome such drawbacks, U.S. Pat. No. 5,021,712 discloses that a coil is wound in the perpendicular direction to the path of the electron beam emitted from the electron beam, and the electric field generated by currents flowing through this coil performs the image correction. However, in this disclosure the electron beam is affected by the electric field generated from the coil so that focusing is not accurate or the image is deformed.

Besides the image rotation due to the outer magnetic field, the projection of electron beam is performed abnormally by the picture tube's resistance so that the image becomes asymmetric horizontally or vertically. When a lot of currents are applied to the vertical/horizontal deflection coils, the image displayed is non-rectangular, that is, nonparallel horizontally and vertically.

When the image is displayed asymmetrically or non-rectangularly, a circuit using the time constants of resistance and condenser is employed to correct the above-discussed problems in the conventional technology. This is because an image displayed asymmetrically or non-rectangularly is nonlinear at a side edge of the image or at the top or bottom edge of the image so that nonlinear, that is, secondary-function, currents therefor required in order to correct the nonlinearity. However, it is not easy to supply the secondary-function currents with a general circuitry configuration. In addition, even with the correction circuit using the time constants of resistance and condenser, it is difficult to precisely correct the image displayed asymmetrically or non-rectangularly.

In order to correct the image displayed non-rectangularly, there is a method of using an OP amplifier. Using the OP amplifier, the horizontal deflection output voltage is converted into a variable resistance to control the horizontal width. This, however, involves a complicated circuit to operate, and is difficult to carry out precise correction.

SUMMARY OF THE INVENTION

In order to overcome such drawbacks, it is an object of the present invention to provide an image-correction circuit for a picture tube in which the image rotation caused by the terrestrial magnetic field is corrected in circuitry configuration, by varying the sync signal of an output image.

It is another object of the present invention to provide an image-correction circuit for a picture tube in which an image displayed asymmetrically vertically or horizontally due to the resistance value of the picture tube is corrected by varying the image output from the horizontal driving portion, using control data previously stored in a memory.

It is still another object of the present invention to provide an image-correction circuit for a picture tube in which an image displayed non-rectangularly is corrected by varying the image output from the horizontal driving portion, using control data previously stored in a memory, so that the displayed image becomes parallel horizontally and vertically.

It is yet another object of the present invention to provide an image-correction circuit for a picture tube in which an image displayed asymmetrically vertically or horizontally due to the resistance value of the picture tube is corrected by previously storing a control value and using the value when the image is displayed asymmetrically.

It is still yet another object of the present invention to provide an image-correction circuit for a picture tube in which an image displayed non-rectangularly is corrected by using a previously stored control value so that the displayed image becomes parallel horizontally and vertically.

To accomplish the objects of the present invention, there is provided an image-correction circuit for a picture tube for correcting an image rotation by a user's manipulation of image control means when an image formed by signals output from horizontal and vertical output portions is rotated in a predetermined direction, the circuit comprising: system control means for determining the rotation degree of vertical and horizontal sync signals when the vertical and horizontal sync signals of the currently displayed image are input according to the manipulation of the image control means, and outputting vertical and horizontal charging/discharging control signals and vertical and horizontal phase signals having voltage levels corresponding to the rotation degree; vertical phase control means for outputting a vertical phase control signal for correcting the vertical rotation according to a vertical blanking signal separated from the currently displayed image, and the voltage levels of the vertical charging/discharging control signal and vertical phase signal; horizontal phase control means for outputting a horizontal phase control signal for correcting the horizontal rotation according to a horizontal blanking signal separated from the currently displayed image, and the voltage levels of the horizontal charging/discharging control signal and horizontal phase signal; vertical phase sync means for receiving the vertical phase control signal and shifting the image vertically by using a vertical output signal fedback from the vertical output portion and the vertical sync signal of the currently displayed image, thereby correcting the vertical position of the image; and horizontal phase sync means for receiving the horizontal phase control signal and shifting the image horizontally by using a horizontal output signal fedback from the horizontal output portion and the horizontal sync signal of the currently displayed image, thereby correcting the horizontal position of the image.

The vertical phase control means comprises: first charging/discharging means for switching the charging/discharging control signal according to the blanking signal in units of vertical blanking periods, thereby inducing charging/discharging; and first pulse-width varying means for varying the voltage charged/discharged in the first charging/discharging circuit by the vertical phase control signal, thereby varying the pulse width of the vertical sync signal.

The first charging/discharging means comprises: a first comparator for outputting a signal corresponding to the difference between a reference voltage established on one side and the voltage level of the charging/discharging control signal; a first switch for switching the charging/discharging control signal to the comparator by using the vertical blanking signal; and a first charging/discharging element for performing charging/discharging according to the operation of the first switch and the level of voltage applied from the first comparator.

The first pulse-width varying means comprises: first comparison switching means for comparing the charging/discharging voltage level of the first charging/discharging means with that of the vertical phase control signal, thereby switching the charging/discharging voltage according to the comparison result; and first oscillating means for varying the pulse width of the vertical sync signal in proportion to the level of the charging/discharging voltage applied to the switching operation of the first comparison switching means.

The horizontal phase control means comprises: second charging/discharging means for switching the charging/discharging control signal according to the blanking signal in units of horizontal blanking periods, thereby inducing charging/discharging; and second pulse-width varying means for varying the voltage charged/discharged in the second charging/discharging circuit by the horizontal phase control signal, thereby varying the pulse width of the horizontal sync signal.

The second charging/discharging means comprises: a second comparator for outputting a signal corresponding to the difference between a reference voltage established on one side and the voltage level of the charging/discharging control signal; a second switch for switching the charging/discharging control signal to the comparator by using the horizontal blanking signal; and a second charging/discharging element for performing charging/discharging according to the operation of the second switch and the level of voltage applied from the second comparator.

The second pulse-width varying means comprises: second comparison switching means for comparing the charging/discharging voltage level of the second charging/discharging means with that of the horizontal phase control signal, thereby switching the charging/discharging voltage according to the comparison result; and second oscillating means for varying the pulse width of the horizontal sync signal in proportion to the level of the charging/discharging voltage applied to the switching operation of the second comparison switching means.

For another embodiment of the present invention, there is provided an image-correction circuit for a picture tube for correcting an image formed with signals output from horizontal and vertical output portions and deflected by vertical and horizontal deflection yokes but displayed asymmetrically, by using a user's manipulation of image control means, the circuit comprising: control means for outputting previously stored corresponding data as vertical and horizontal pin balance control signals according to the user's manipulation of the image control means and according to the degree of asymmetry; vertical pin balance correction means for correcting the signal output from the vertical output portion by the vertical pin balance control signal so that the output signal becomes symmetric vertically; and horizontal pin balance correction means for correcting the signal output from the horizontal output portion by the horizontal pin balance control signal so that the output signal becomes symmetric horizontally.

The control means comprises: a central processing unit for outputting an address signal corresponding to the signal input by the key manipulation and the self-oscillating clock signal of a predetermined frequency; a decoder for decoding the address signal by using the clock signal output from the central processing unit and the flyback pulse separated from the currently displayed image; a pin balance memory for outputting vertical and horizontal pin balance correction data corresponding to the decoded address signal output from the decoder; and a digital/analog converter for converting data output from the pin balance memory into an analog signal and outputting the result as vertical and horizontal pin balance control signals.

For still another embodiment of the present invention, there is provided an image-correction circuit for a picture tube for correcting an image formed with signals output from horizontal and vertical output portions and deflected by vertical and horizontal deflection yokes but displayed non-rectangularly, by using a user's manipulation of image control means, the circuit comprising: control means for outputting previously stored corresponding data as vertical and horizontal pin cushion control signals according to the user's manipulation of the image control means and according to the degree of vertical and horizontal non-parallelism; vertical pin cushion correction means for correcting the signal output from the vertical output portion by the vertical pin cushion control signal so that the output signal becomes parallel vertically; and horizontal pin cushion correction means for correcting the signal output from the horizontal output portion by the horizontal pin balance control signal so that the output signal becomes parallel horizontally.

For still yet another embodiment of the present invention, there is provided an image-correction circuit for a picture tube for correcting an image formed with signals output from horizontal and vertical output portions and deflected by vertical and horizontal deflection yokes but displayed asymmetrically, by using a user's manipulation of image control means, the circuit comprising: control means for outputting previously stored corresponding data as vertical and horizontal pin balance control signals according to the user's manipulation of the image control means and according to the degree of asymmetry, and outputting previously stored corresponding data as vertical and horizontal pin cushion control signals according to the user's manipulation of the image control means and according to the degree of vertical and horizontal non-parallelism; horizontal pin balance correction means for correcting the signal output from the horizontal output portion by the horizontal pin balance control signal so that the output signal becomes symmetric horizontally; vertical pin balance correction means for correcting the signal output from the vertical output portion by the vertical pin balance control signal so that the output signal becomes symmetric vertically; horizontal pin cushion correction means for re-correcting the image which is corrected to become symmetric horizontally in the horizontal pin balance correction means so that the image becomes parallel horizontally and is output to the horizontal deflection yoke; and vertical pin cushion correction means for re-correcting the image which is corrected to become symmetric vertically in the vertical pin balance correction means so that the image becomes parallel vertically and is output to the vertical deflection yoke.

For a further embodiment of the present invention, there is provided an image-correction method for a picture tube for correcting an image displayed asymmetrically vertically and horizontally by manipulating image control means, the method comprising the steps of: setting a pin balance correction mode according to a signal input through the manipulation of the image control means; correcting the image displayed asymmetrically vertically by using previously stored data through the manipulation of the image control means; and correcting the image displayed asymmetrically horizontally by using previously stored data through the manipulation of the image control means.

The step of correcting the image displayed asymmetrically vertically comprises the substeps of: outputting a signal input through the manipulation of the image control means as an address signal; decoding the output address signal by using the flyback pulse of the currently displayed image; reading out previously stored data corresponding the decoded address signal from a memory; and converting the read data into an analog signal and outputting the result as a vertical balance control signal.

The step of correcting the image displayed asymmetrically horizontally comprises the substeps of: outputting a signal input through the manipulation of the image control means as an address signal; decoding the output address signal by using the flyback pulse of the currently displayed image; reading out previously stored data corresponding the decoded address signal from a memory; and converting the read data into an analog signal and outputting the result as a horizontal balance control signal.

For a further embodiment of the present invention, there is provided an image-correction method for a picture tube for correcting an image displayed non-rectangularly by manipulating image control means, the method comprising the steps of: setting a pin cushion correction mode according to a signal input through the manipulation of the image control means; correcting the image to become parallel vertically by using previously stored data through the manipulation of the image control means; and correcting the image to become parallel horizontally by using previously stored data through the manipulation of the image control means.

The step of correcting the image become parallel vertically comprises the substeps of: outputting a signal input through the manipulation of the image control means as an address signal; decoding the output address signal by using the flyback pulse of the currently displayed image; reading out previously stored data corresponding the decoded address signal from a memory; and converting the read data into an analog signal and outputting the result as a vertical cushion control signal.

The step of correcting the image to become parallel horizontally comprises the substeps of: outputting a signal input through the manipulation of the image control means as an address signal; decoding the output address signal by using the flyback pulse of the currently displayed image; reading out previously stored data corresponding the decoded address signal from a memory; and converting the read data into an analog signal and outputting the result as a horizontal cushion control signal.

BRIEF DESCRIPTION OF THE ATTACHED DRAWINGS

DETAILED DESCRIPTION OF THE INVENTION

Figure 2:
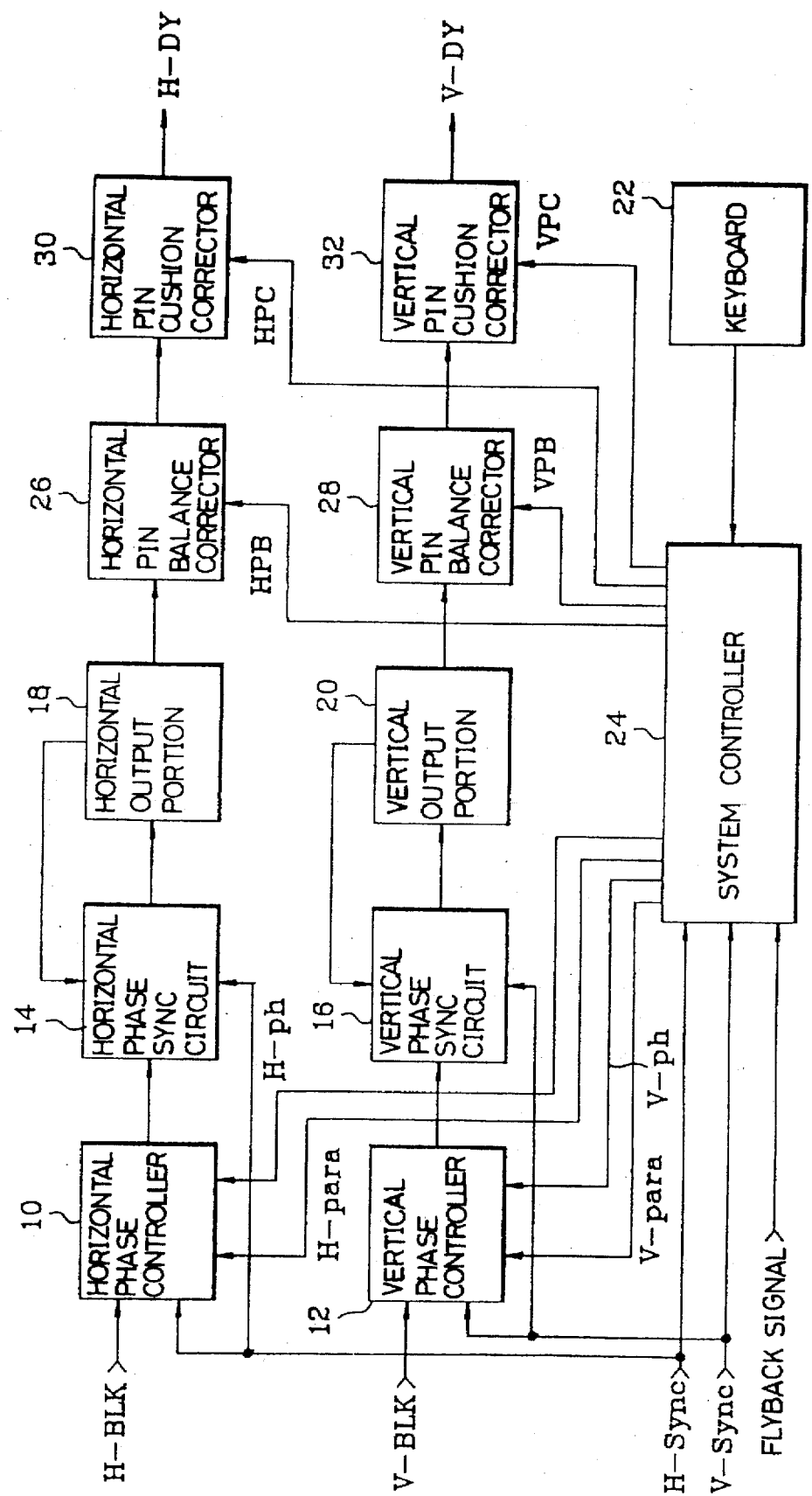
FIG. 2 is a block diagram of an embodiment of an image-correction circuit for a picture tube of the present invention.

Referring to FIG. 2, in order to correct the image rotation, an image-correction circuit of the present invention comprises a horizontal phase controller 10 for receiving a horizontal sync signal H-Sync and horizontal blanking signal H-BLK, a vertical phase controller 12 for receiving a vertical sync signal V-Sync and vertical blanking signal V-BLK, a horizontal phase sync circuit 14 for receiving horizontal sync signal H-Sync, the output of horizontal phase controller 10 and a fedback horizontal sync signal, a vertical phase sync circuit 16 for receiving vertical sync signal V-Sync, the output of vertical phase controller 12 and a fedback vertical sync signal, a horizontal output portion 18 for outputting a signal phase-locked in horizontal phase sync circuit 14 and feeding back the output horizontal sync signal to horizontal phase sync circuit 14, and a vertical output portion 20 for outputting a signal phase-locked in vertical phase sync circuit 16 and feeding back the output vertical sync signal to vertical phase sync circuit 16. A keyboard 22 having keys which a user manipulates in order to correct an image is connected to one side of a system controller 24.

As vertical and horizontal sync signals H-Sync and V-Sync and a flyback pulse output from a flyback transformer (not shown) are input to one side of system controller 24, this system controller outputs a vertical charging/discharging control signal V-para and vertical phase signal V-ph to vertical phase controller 12, and a horizontal charging/discharging control signal H-para and horizontal phase signal H-ph to horizontal phase controller 10.

In order to correct an image displayed asymmetrically on the picture tube, there are provided a horizontal pin balance corrector 26 for receiving the signal output from horizontal output portion 18, and a vertical pin balance corrector 28 for receiving the signal output from vertical output portion 20. Horizontal and vertical pin balance control signals HPB and VPB output from system controller 24 are input to horizontal and vertical balance correctors 26 and 28.

In order to correct an image displayed non-rectangularly on the picture tube, there are provided horizontal and vertical pin cushion correctors 30 and 32. Horizontal and vertical pin cushion control signals HPC and VPC output from system controller 24 are input to horizontal and vertical cushion correctors 30 and 32.

Figure 3:
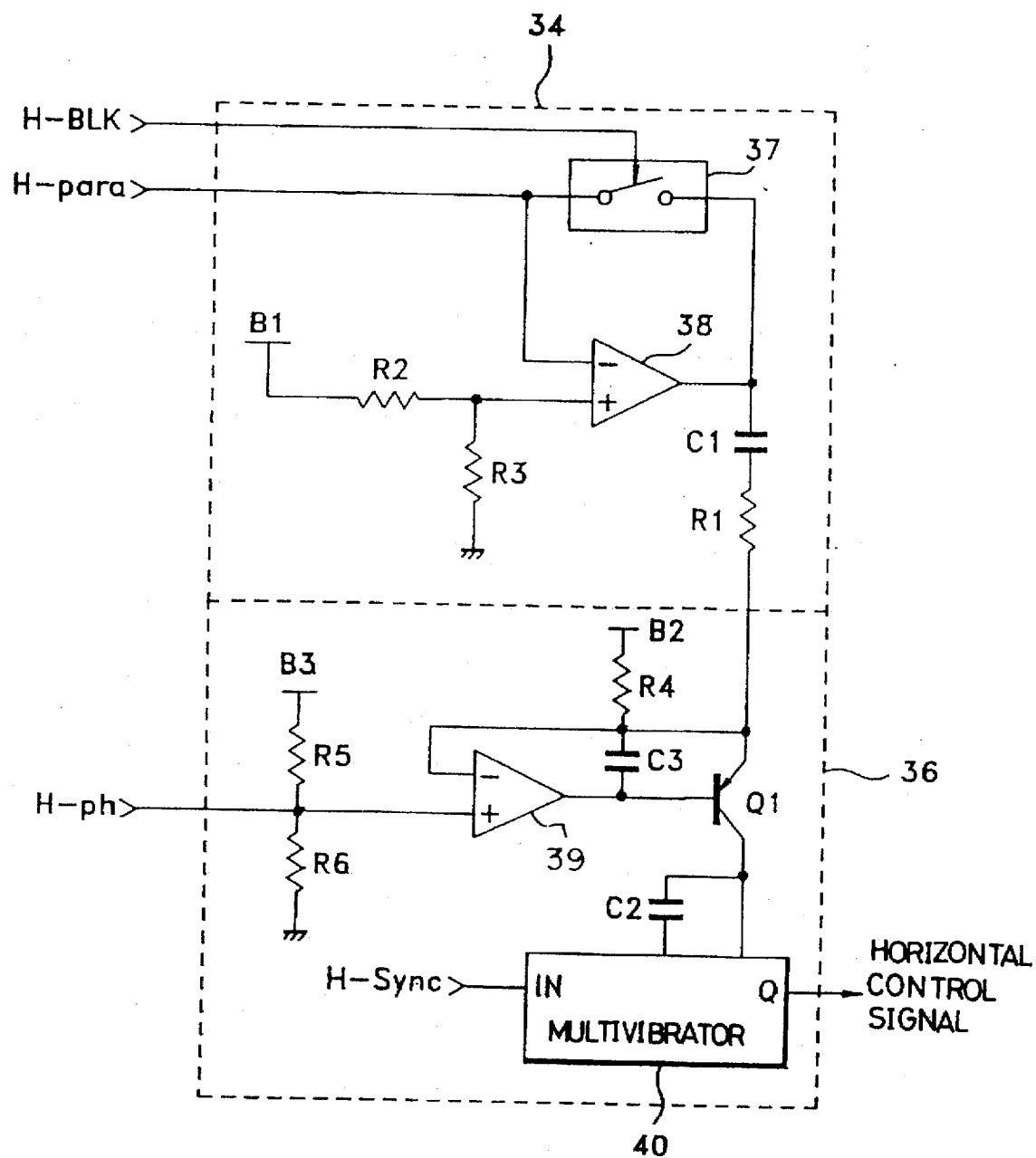
FIG. 3 is a detailed circuit diagram of the horizontal phase controller of FIG. 2.

The horizontal and vertical phase controllers 10 and 12 have the same configuration, which is illustrated in FIG. 3 in detail. Horizontal and vertical phase controllers 10 and 12 output the signal received from system controller 24 and the horizontal and vertical phase control signals generated by the currently displayed blanking signal to horizontal and vertical sync circuits 14 and 16. In FIG. 3, the operation of horizontal phase controller 10 is depicted. The operation of vertical phase controller 12 corresponds thereto. Horizontal and vertical phase controllers 10 and 12 roughly have a charging/discharging circuit 34 and pulse-width varying circuit 36.

To explain the configuration of horizontal or vertical phase controller 10 or 12 in detail with reference to FIG. 3, in charging/discharging circuit 34, horizontal blanking signal H-BLK is applied to the control side of switch 37. Horizontal charging/discharging control signal H-para is applied to one side of switch 37 and to the inverting port–of comparator 38. Voltage-dividing resistors R2 and R3 are coupled to the non-inverting port +of comparator 38. A reference voltage B1 is applied via resistor R2. The other side of switch 37 and the output of comparator 38 are coupled to serially connected resistor R1 and condenser C1 which are charging/discharging elements.

In pulse-width varying circuit 36, serially connected resistor R1 and condenser C1, charging/discharging elements, are tied to the emitter of transistor Q1. The output of comparator 39 is coupled to the base of transistor Q1. A multivibrator 40 is connected to the collector of transistor Q1. A condenser C2 is coupled in parallel thereto. The inverting port of comparator 39 is tied to the node connected to the emitter of transistor Q1. A condenser C3 is coupled between the node and the output of comparator 39. A resistor R4 to which a reference voltage B2 is applied is coupled to the node.

Voltage-dividing resistors R5 and R6 are tied to the noninverting port+of comparator 39. A reference voltage B3 is applied to resistor R5. Horizontal phase signal H-ph is applied to a node which is formed by the connection of voltage-dividing resistors R5 and R6. Horizontal sync signal H-Sync is input to the input port IN of multivibrator 40. A horizontal control signal is output through the output Q thereof.

The configuration of vertical phase controller 12 is the same as FIG. 3. Instead of horizontal blanking signal H-BLK, horizontal charging/discharging control signal H-para and horizontal phase signal H-ph, vertical blanking signal V-BLK, vertical charging/discharging control signal V-para and vertical phase signal V-ph are input to the vertical phase controller.

The operation of correcting the image rotation caused by the terrestrial magnetic field will be described in more detail with reference to FIGS. 4A–5D.

When an image displayed is rotated due to the terrestrial magnetic field or outer magnetic field, the user manipulates image-controlling keys mounted on keyboard 22 so as to correct the problem. As a signal corresponding to the key manipulated by the user is input to system controller 24, system controller 24 outputs control signals on basis of vertical sync signal V-Sync and horizontal sync signal H-Sync of the currently output image. Here, the control signals are vertical and horizontal charging/discharging control signals V-para and H-para having voltage levels corresponding to the rotation degree of the current image, and vertical and horizontal phase signals V-ph and H-ph. Vertical and horizontal charging/discharging control signals V-para and H-para and vertical and horizontal phase signals V-ph and H-ph are input to horizontal and vertical phase controllers 10 and 12, respectively.

Horizontal charging/discharging control signal H-para input to horizontal phase controller 10 is input to charging/discharging circuit 34. Horizontal phase signal H-ph is input to pulse-width varying circuit 36. Horizontal blanking signal H-BLK and horizontal sync signal H-Sync separated from the currently displayed image are input to horizontal phase controller 10 to output a horizontal control signal for correcting the rotated image horizontally.

In other words, when the user manipulates a scanning key or image-controlling key (not shown) in order to perform the correction of the rotated image as much as the rotation degree, system controller 24 outputs horizontal charging/discharging control signal H-para having a corresponding voltage level and horizontal phase signal H-ph. Here, horizontal charging/discharging control signal H-para is applied to switch 37 and the non-inverting port–of comparator 38. As horizontal blanking signal H-BLK is applied to the control side of switch 37, this switch has the same switching time as the horizontal blanking period.

According to the switching operation of switch 37, charging/discharging is performed in resistor R1 and condenser C1, the charging/discharging elements.

If the potential of horizontal charging/discharging control signal H-para is smaller than the reference voltage applied to the non-inverting port +of comparator 38, resistor R1 and condenser C1, the charging/discharging elements, perform charging. If the potential of horizontal charging/discharging control signal H-para is greater than the reference voltage applied to the non-inverting port+of comparator 38, resistor R1 and condenser C1, the charging/discharging elements, perform discharging.

Figure 4A:
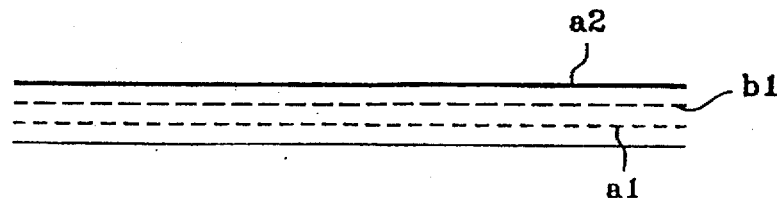
FIGS. 4A–4F are waveforms present at respective portions of FIG. 3.

Given that b1 of FIG. 4A is the level of reference voltage applied to the non-inverting port+of comparator 38, when the potential of charging/discharging control signal H-para applied from system controller 24 is a1, charging is performed. When the potential of charging/discharging control signal H-para is a2, discharging is performed.

Figure 4B:
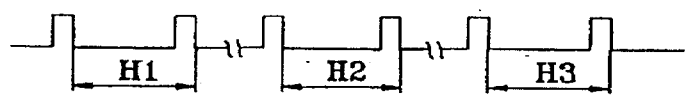

This charging/discharging operation is switched by switch 37. A blanking signal of FIG. 4B is applied to the control side of switch 37. For horizontal phase controller 10, switch 37 is switched for respective horizontal periods H1, H2 and H3. When charging is performed according thereto, there is indicated the waveform of FIG. 4C.

Figure 4C:
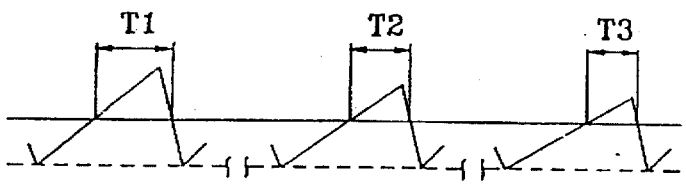

According to the level of charging/discharging control signal H-para output from system controller 24, waveforms of different slopes are indicated as shown in FIGS. 4C. As the peak voltages are different according to the different slopes, when voltages of the waveforms of FIG. 4C are applied to the non-inverting port–of comparator 39, comparator 39 compares them with the voltage level applied to the non-inverting port +thereof, and outputs a voltage corresponding to their difference to the output port.

Therefore, transistor Q1 has switching times T1, T2 and T3 which are different for respective horizontal periods, as shown in FIG. 4C, according to the voltage level of the output of comparator 39 applied to the base thereof. In other words, system controller 24 applies charging/discharging control signal H-para by increasing or decreasing its level for respective horizontal periods so that transistor Q1 has switching times T1, T2 and T3 which are different for respective horizontal periods.

Figure 4D:
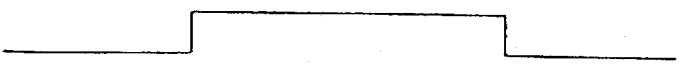
Figure 4E:
Figure 4F:

According to the different switching times, the charging/discharging voltage applied to the charging/discharging element is charged in condenser C2. The pulse width of the output pulse of multivibrator 40 is determined by the level of the charged voltage. Here, the output pulse of multivibrator 40 has a pulse width corresponding to the voltage level applied to condenser C2 connected to one side thereof, with reference of the rising time of the horizontal sync signal. As a result, pulse-width-different signals are triggered as shown in FIGS. 4D, 4E and 4F. The pulses of FIGS. 4D, 4E and 4F indicate horizontal control signals to be output to horizontal sync circuit 14.

The output sequence of the pulses of FIGS. 4D, 4E and 4F can be changed for horizontal periods according to charging or discharging. The above description is for horizontal phase controller 10.

In case of vertical phase controller 12, the switch is switched by vertical blanking signal V-BLK generated for respective fields. This controller performs the same charging operation as that of horizontal phase controller 10. The pulses in which the pulse width of the vertical sync signal is varied as shown in FIGS. 4D, 4E and 4F are output to vertical phase sync circuit 16 as the vertical control signal.

As in the operation of FIG. 3, the pulse width of horizontal sync signal H-Sync input to horizontal phase controller 10 and vertical sync signal V-Sync input to vertical phase controller 12 are varied by horizontal and vertical charging/discharging control signals H-para and V-para and horizontal and vertical phase signals H-ph and V-ph output from system controller 24 and horizontal and vertical blanking signals H-BLK and V-BLK. The pulse-width-varied signals are input to horizontal and vertical sync circuits 14 and 16.

Meanwhile, the rotated image is corrected vertically and horizontally by horizontal and vertical phase controllers 10 and 12. More specifically, the vertical correction is performed as shown in FIGS. 5A and 5B, the horizontal correction as shown in FIGS. 5C and 5D.

Figure 5A:
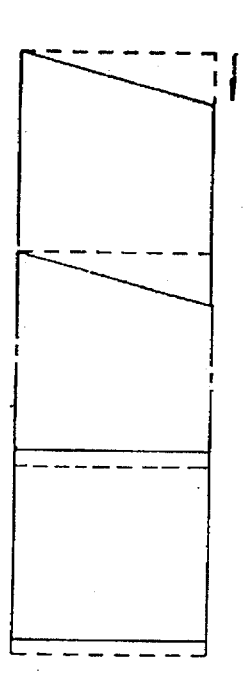
FIGS. 5A and 5B illustrate vertical corrections of a rotated image.
Figure 5B:
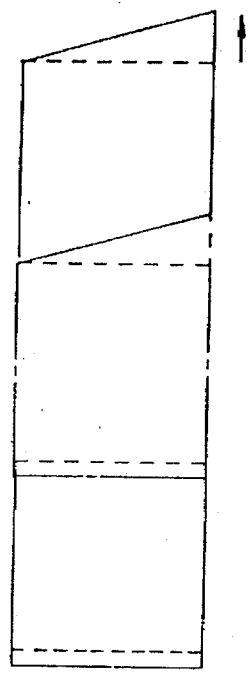

The charging/discharging operation is performed in the charging/discharging circuit of FIG. 3 according to the level of vertical charging/discharging control signal V-para output from system controller 24, enabling selective correction in the respective rotation directions as shown in FIGS. 5A and 5B.

Figure 5C:
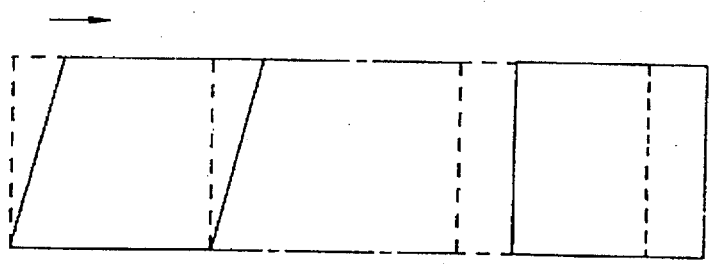
FIGS. 5C and 5D illustrate horizontal corrections of a rotated image.
Figure 5D:
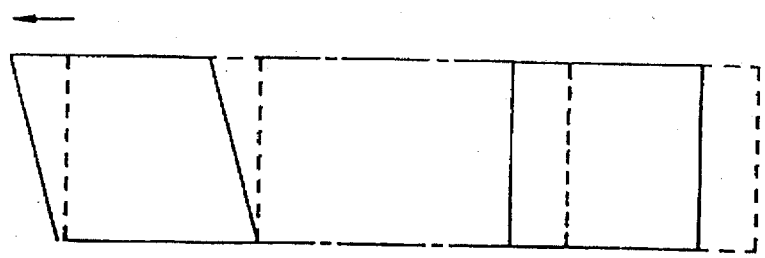

Likewise, for the horizontal correction, the charging/discharging operation is performed in the charging/discharging circuit of FIG. 3 according to the level of horizontal charging/discharging control signal H-para output from system controller 24, enabling selective correction in the respective rotation directions as shown in FIGS. 5C and 5D.

When the image rotated in the arrow directions as indicated in the upper portion of FIGS. 5A and 5B and the left portion of FIGS. 5C and 5D is corrected by horizontal and vertical phase controllers 10 and 12, the result is indicated as shown in the lower portion of FIGS. 5A and 5B and the right portion of FIGS. 5C and 5D. As indicated by a full line, this corrected image deviates horizontally and vertically slightly from the precise display position indicated by a dotted line in FIGS. 5A-5D. Therefore, the horizontal and vertical control signals output from horizontal and vertical phase controllers 10 and 12 are input to horizontal and vertical sync circuits 14 and 16 for the purpose of precise correction.

Here, horizontal and vertical phase circuits 14 and 16 are general phase-locked circuits (PLL), which shift the position of the respective sync signals so as to form an image at a precise position indicated by the dotted line of FIGS. 5A-5D. For this, the current sync signal and a sync signal fedback from horizontal and vertical output portions 18 and 20 are compared to shift its phase precisely according to the comparison result.

The horizontal correction of the rotated image is performed in horizontal phase controller 10 and horizontal phase sync circuit 14. The vertical correction of the rotated image is performed in vertical phase controller 12 and vertical phase sync circuit 16. Through this process, the image displayed on the picture tube via horizontal and vertical output portions 18 and 20 is formed at a precise position.

Meanwhile, the image displayed asymmetrically due to the picture tube's resistance or the outer magnetic field and the image displayed non-rectangularly due to the excess current provided to the deflection coil can be corrected according to the operation with reference to FIGS. 2, 6–8.

First, in order to correct an image displayed asymmetrically or non-rectangularly, there is required a secondary function relation for the function of the output value for horizontal and vertical positions. Given that the correction position is X and the output value of the correction position is Y, the relation between X and Y is expressed as in the following equation (1).

$$Y=AX^2+BX+V \qquad \text{equation (1)}$$

Where values A, B and C are determined by the currently displayed horizontal and vertical sync signals. However, as a matter of fact, this function relation is difficult to implement in circuitry.

For an alternative, asymmetric correction data and non-rectangular data are previously stored as values corresponding to this function, and, if required, the stored data are used as the user manipulates the key. This enables the expression of a predetermined function. Therefore, when corresponding data are previously stored and used in order to solve the difficulty of circuitry configuration for the correction, the whole configuration of circuit is simplified, enabling precise correction. For this operation, it is desirable that system controller 24 of FIG. 2 is formed as shown in FIG. 6.

Figure 6:
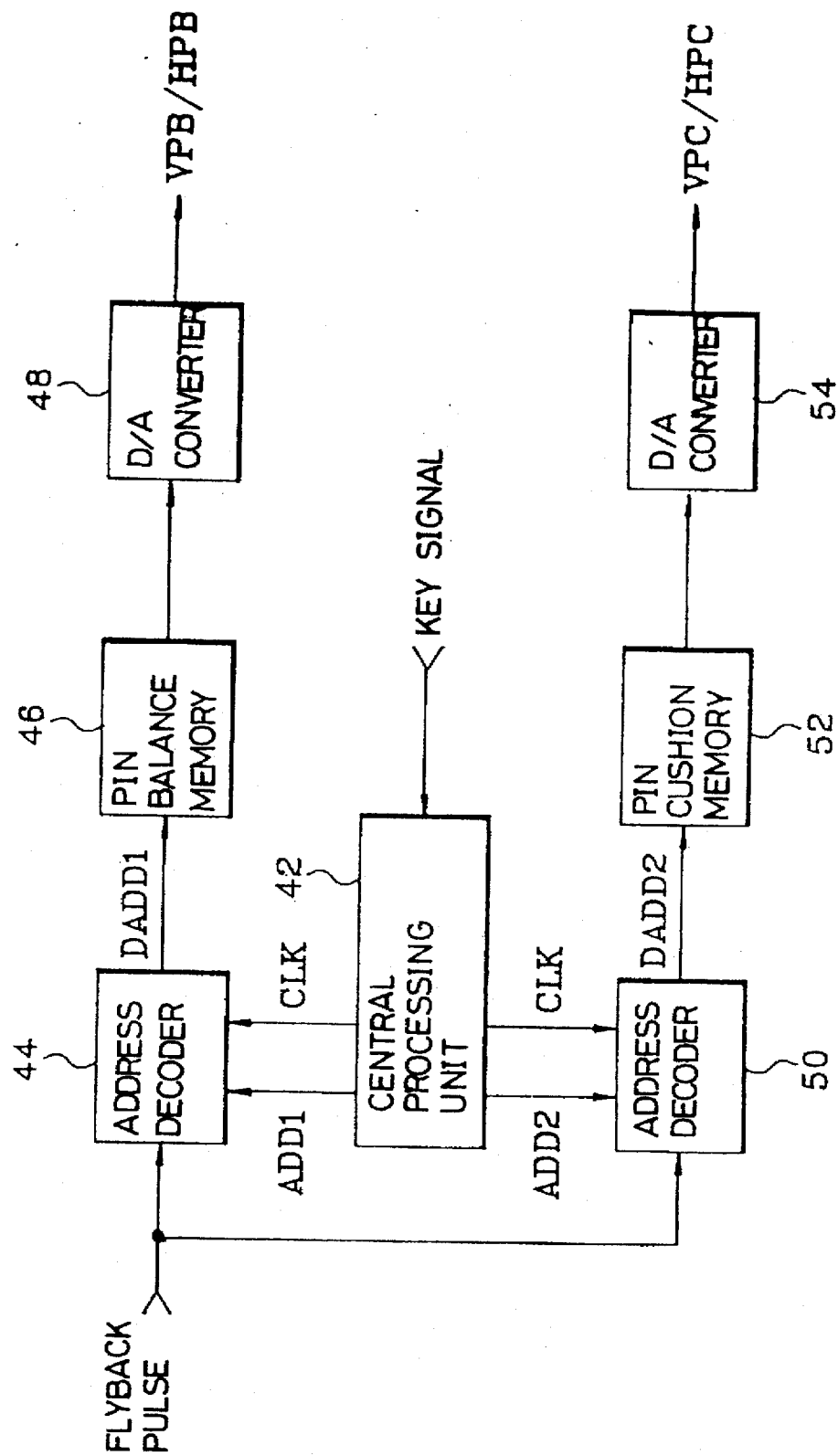
FIG. 6 is a detailed block diagram of the system controller for correcting an asymmetric and non-rectangular picture displayed.

Referring to FIG. 6, there are provided a CPU 42 to which a key signal is applied by the user's manipulation of keyboard 22, means for correcting an image displayed asymmetrically, and means for correcting an image displayed non-rectangularly.

Here, the means for asymmetric correction comprises an address decoder 44 to which address signal ADD1 and clock signal CLK are applied from CPU 42 and a flyback pulse is applied through the other side to output decoded address signal DADD1, a pin balance memory 46 for outputting data stored in the address corresponding to decoded address signal DADD1, and a digital/analog (D/A) converter 48 for converting the data output from pin balance memory 46 into an analog signal.

The means for non-rectangular correction comprises an address decoder 50 to which address signal ADD2 and clock signal CLK are applied from CPU 42 and a flyback pulse is applied through the other side to output decoded address signal DADD2, a pin cushion memory 52 for outputting data stored in the address corresponding to decoded address signal DADD2, and a D/A converter 54 for converting the data output from pin cushion memory 52 into an analog signal.

In this configuration, data stored in pin balance memory 46 and pin cushion memory 52 are to correct asymmetric display and non-rectangular display, respectively. The clock signal output from CPU 42 is provided to drive address decoders 44 and 50. The flyback pulse is for resetting address decoders 44 and 50 in units of fields or horizontal periods.

When an image is displayed asymmetrically deviating left or right by 2s or upward or downward by 2h and the user manipulates the key on the keyboard according to the asymmetric degree, a key signal corresponding thereto is input to CPU 42, which then outputs address signal ADD1 corresponding to the input key signal to address decoder 44. Address decoder 44 decodes the input address signal in a code recognizable in pin balance memory 46 by using the flyback pulse and clock signal CLK. The decoded address signal DADD1 is input to pin balance memory 46.

Pin balance memory 46 outputs data corresponding to decoded address signal DADD1 to D/A converter 48. D/A converter 48 converts the data output from pin balance memory 46 into an analog signal, which is output as vertical and horizontal pin balance control signals VPB and HPB.

Figure 1:
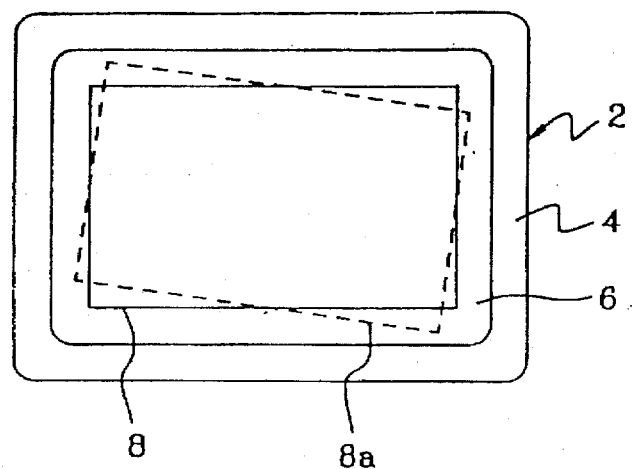
FIG. 1 shows an image rotation phenomenon caused in a picture tube.
Figure 7:
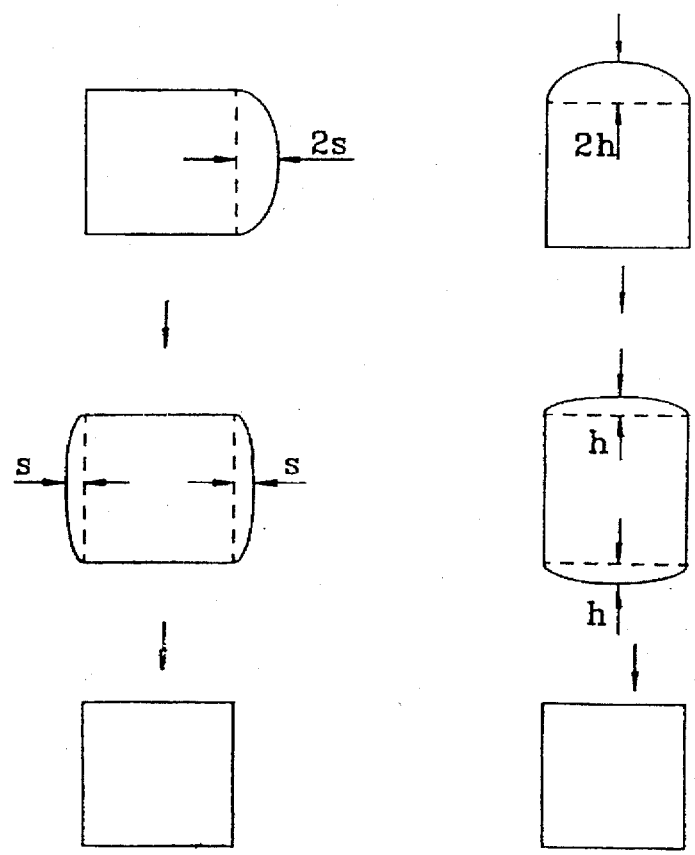
FIG. 7 shows the sequence of correcting the asymmetric picture.

Here, the vertical and horizontal asymmetric-correction data are stored in different regions of pin balance memory 46. Therefore, when the user manipulates keys for vertical or horizontal correction, CPU 42 recognizes it and outputs an address signal corresponding to the input key. As a result, vertical and horizontal pin balance control signals VPB and HPB are output. Vertical and horizontal pin balance control signals VPB and HPB are input to horizontal and vertical pin balance correctors 26 and 28 of FIG. 2 so that the signal output from horizontal and vertical output portions 18 and 20 can be corrected to be symmetric horizontally, as shown in FIG. 7.

In this situation, the asymmetric-corrected image becomes rectangular precisely. However, the image may be formed symmetric in parabola, while being spaced apart by distance s or h horizontally or vertically.

In the operation of correcting the image displayed non-rectangularly, when the user manipulates the key on the keyboard according to the non-rectangular degree, a key signal corresponding thereto is input to CPU 42, which then outputs address signal ADD2 corresponding to the input key signal to address decoder 50. Address decoder 50 decodes the input address signal in a code recognizable in pin balance memory 52 by using the flyback pulse and clock signal CLK. The decoded address signal DADD2 is input to pin balance memory 52.

Pin balance memory 52 outputs data corresponding to decoded address signal DADD2 to D/A converter 54. D/A converter 54 converts the data output from pin balance memory 52 into an analog signal, which is output as vertical and horizontal pin cushion control signals VPC and HPC.

Here, the vertical (up and down) and horizontal (left and right) non-parallel-correction data are stored in different regions of pin balance memory 52. Therefore, when the user manipulates keys for vertical or horizontal non-parallel correction, CPU 42 recognizes it and outputs an address signal corresponding to the input key. As a result, vertical and horizontal pin cushion control signals VPC and HPC are output. Vertical and horizontal pin cushion control signals VPC and HPC are input to horizontal and vertical pin cushion correctors 30 and 32 of FIG. 2 so that the signal output from horizontal and vertical pin balance correctors 26 and 28 can be corrected to be parallel horizontally and vertically, as shown in FIG. 7. As a result, as shown in the lower portion of FIG. 7, the image is displayed parallel horizontally and vertically.

Figure 8:
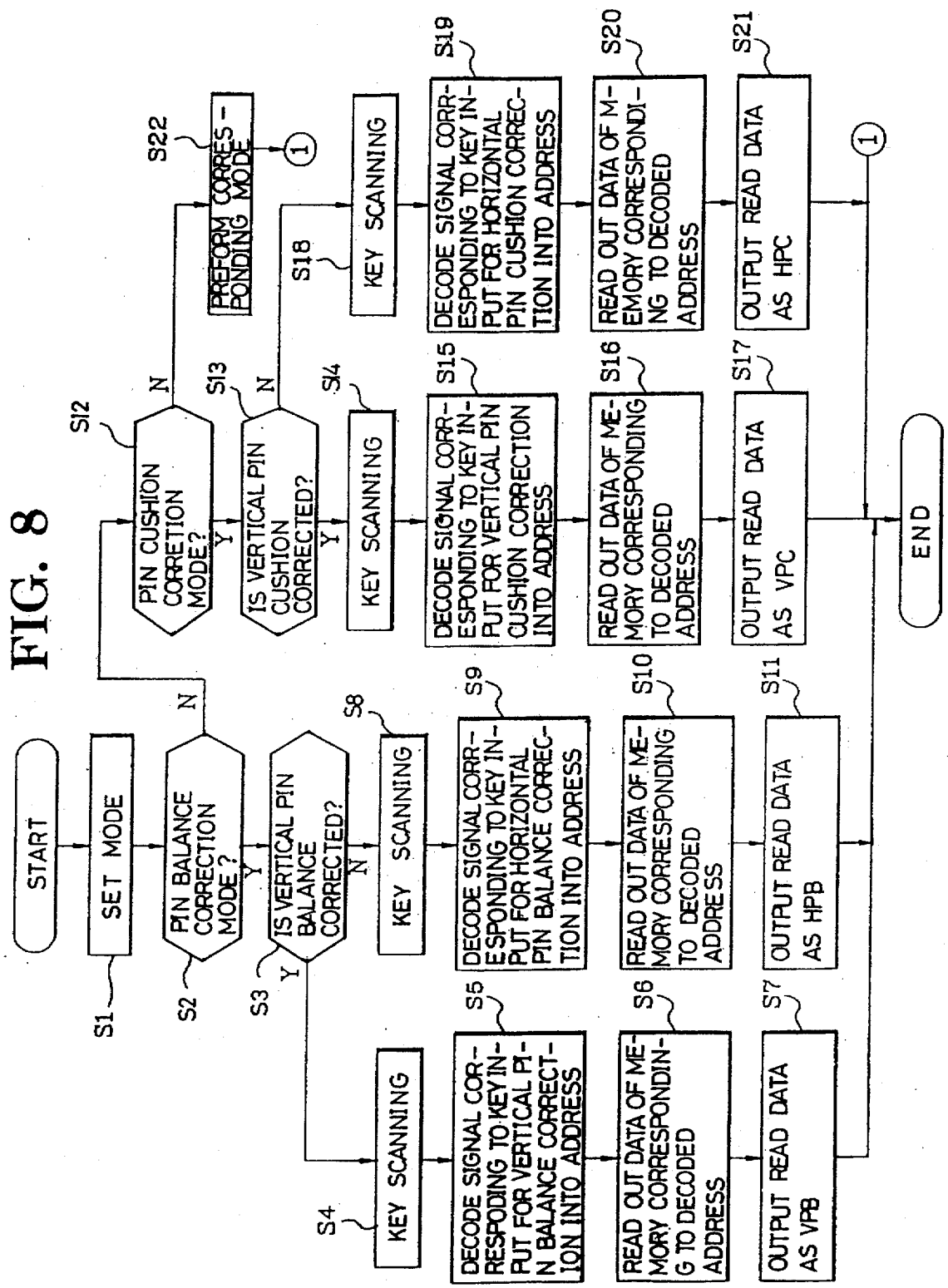
FIG. 8 is a flowchart for correcting the asymmetric and non-rectangular picture displayed.

A method of correcting images on the picture tube constructed as in FIGS. 2 and 6 will be explained with reference to FIG. 8.

First, after the user operates the picture tube, a mode to be performed is set in step S1.

Thereafter, CPU 42 confirms whether the currently set mode is a pin balance correction mode or not in step S2. If so, it is confirmed whether the current mode is for a vertical pin balance correction or not in step S3. Here, if the vertical pin balance correction mode, CPU 42 scans the input key signal in step S4, and outputs the signal corresponding to the key input for vertical pin balance correction as address signal ADD1 in step S5. Address signal ADD1 is decoded in address decoder 44.

In step S6, data of the memory corresponding to decoded address DADD1 is read out. Here, the read data is for vertical pin balance correction because it is performed currently. The read data is output to vertical pin balance control signal VPB via the D/A converter in step S7.

If CPU 42 determines that the current mode is not the vertical pin balance correction mode in step S3, the key signal recognized as horizontal pin balance correction signal is scanned in step S8. In step S9, the signal corresponding to the key for horizontal pin balance correction is output as address signal ADD1, which is decoded in address decoder 44.

In step S10, data of the memory corresponding to decoded address DADD1 is read out. Here, the read data is for horizontal pin balance correction because it is performed currently. The read data is output to horizontal pin balance control signal HPB via the D/A converter in step S11.

If it is determined that the current mode is not the pin balance correction mode in step S2, CPU 42 performs step S12 and confirms whether the current mode is the pin cushion correction mode or not. If so, it is confirmed whether the current mode is the vertical pin cushion correction mode or not in step S13. If so, the input key signal is scanned in step S14, and outputs the signal corresponding to the key for vertical pin cushion correction is output as address signal ADD2, which is decoded in address decoder 50. In step S16, data of the memory corresponding to address DADD2 is read out. Here, the read data is for vertical pin cushion correction because it is performed currently. The read data is output to vertical pin cushion control signal VPC via the D/A converter in step S17.

If the mode is not the vertical pin cushion mode in step S13, CPU 42 scans the key signal recognized as horizontal pin cushion correction in step S18. In step S19, the signal corresponding to the key for horizontal pin cushion correction is output as address signal ADD2, which is decoded in address decoder 50. In step S20, data of the memory corresponding to decoded DADD2 is read out. Here, the read data is for horizontal pin cushion correction because it is performed currently. The read data is output to horizontal pin cushion control signal HPC via the D/A converter in step S21. If it is determined that the mode is not the pin cushion correction mode in step S12, CPU 42 performs a mode corresponding to the user-designated mode in step S22.

As described above, in the present invention, for the asymmetric and non-rectangular correction which is difficult to implement in circuitry, data for asymmetric correction and data for non-rectangular correction are previously established and stored in a memory so that images can be corrected normally by the user's simple manipulation of keys.

In conclusion, in the image-correction circuit for a picture tube of the present invention, the image rotation caused by the terrestrial magnetic field is corrected in circuitry configuration, simplifying the configuration of the picture tube and precisely correcting the image rotation.

Further, an image displayed asymmetrically vertically or horizontally due to the resistance value of the picture tube is corrected by previously storing a control value, thereby simply forming the asymmetric-correction circuit difficult to implement in circuitry.

In addition, an image displayed non-rectangularly is corrected by using a previously stored control value so that the displayed image becomes parallel horizontally and vertically.

What is claimed is:

1. In a picture tube apparatus for displaying images having horizontal output circuit means and vertical output circuit means for outputting signals that form a currently displayed image, an image-correction circuit for correcting said currently displayed image that has been said image-correction circuit comprising:

an input device for generating correction signals to transform said currently displayed image from an uncorrected image that has been rotated to a corrected image in response to manipulation by a user;

system control means responsive to said correction signals generated from said input device for correcting said uncorrected image, said system control means processing vertical sync signals and horizontal sync signals corresponding to said currently displayed image to output respective vertical and horizontal charging/discharging control signals and respective vertical and horizontal phase signals, each of said vertical and horizontal charging/discharging control signals and respective vertical and horizontal phase signals having voltage levels corresponding to a rotation degree for correcting said currently displayed image;

vertical phase control means responsive to said voltage levels of said vertical charging/discharging and vertical phase signals and to a vertical blanking signal separate from said uncorrected image for outputting a vertical phase control signal for rotating said uncorrected image in a vertical direction;

horizontal phase control means responsive to said voltage levels of said horizontal charging/discharging and horizontal phase signals and to a horizontal blanking signal separate from said uncorrected image for outputting a horizontal phase control signal for rotating said uncorrected image in a horizontal direction;

vertical phase sync means responsive to said vertical phase control signal output from said vertical phase control means, a vertical output signal feedback from the vertical output circuit means, and the vertical sync signal of the currently displayed image, for shifting said currently displayed image in a vertical direction to thereby correct the vertical position of said uncorrected image; and horizontal phase sync means responsive to said horizontal phase control signal output from said horizontal phase control means, a horizontal output signal feedback from the horizontal output circuit means, and the horizontal sync signal of the currently displayed image, for shifting the image in a horizontal direction to thereby correct the horizontal position of said currently displayed image.

2. An image-correction circuit for a picture tube as claimed in claim 1, wherein said system control means varies the voltage level of said charging/discharging control signal applied to said vertical phase control means according to the rotation degree of the image.

3. An image-correction circuit for a picture tube as claimed in claim 1, wherein said system control means varies the voltage level of said charging/discharging control signal applied to said horizontal phase control means according to the rotation degree of the image.

4. An image-correction circuit for a picture tube as claimed in claim 1, wherein said system control means varies the voltage level of said vertical phase signal applied to said vertical phase control means according to the rotation degree of the image.

5. An image-correction circuit for a picture tube as claimed in claim 1, wherein said system control means varies the voltage level of said horizontal phase signal applied to said horizontal phase control means according to the rotation degree of the image.

6. An image-correction circuit for a picture tube as claimed in claim 1, wherein said vertical phase control means comprises:

first charging/discharging means for switching said charging/discharging control signal according to the blanking signal in units of vertical blanking periods, thereby inducing charging/discharging; and first pulse-width varying means for varying the voltage charged/discharged in said first charging/discharging circuit by said vertical phase control signal, thereby varying the pulse width of said vertical sync signal.

7. An image-correction circuit for a picture tube as claimed in claim 6, wherein said first charging/discharging means comprises:

a first comparator for outputting a signal corresponding to the difference between a reference voltage established on one side and the voltage level of said charging/discharging control signal;

a first switch for switching said charging/discharging control signal to said comparator by using said vertical blanking signal; and a first charging/discharging element for performing charging/discharging according to the operation of said first switch and the level of voltage applied from said first comparator.

8. An image-correction circuit for a picture tube as claimed in claim 7, wherein said first charging/discharging element comprises a resistor and a condenser.

9. An image-correction circuit for a picture tube as claimed in claim 6, wherein said first pulse-width varying means comprises:

first comparison switching means for comparing the charging/discharging voltage level of said first charging/discharging means with that of said vertical phase control signal, thereby switching the charging/discharging voltage according to the comparison result; and first oscillating means for varying the pulse width of said vertical sync signal in proportion to the level of the charging/discharging voltage applied to the switching operation of said first comparison switching means.

10. An image-correction circuit for a picture tube as claimed in claim 1, wherein said horizontal phase control means comprises:

second charging/discharging means for switching said charging/discharging control signal according to the blanking signal in units of horizontal blanking periods, thereby inducing charging/discharging; and second pulse-width varying means for varying the voltage charged/discharged in said second charging/discharging circuit by said horizontal phase control signal, thereby varying the pulse width of said horizontal sync signal.

11. An image-correction circuit for a picture tube as claimed in claim 10, wherein said second charging/discharging means comprises:

a second comparator for outputting a signal corresponding to the difference between a reference voltage established on one side and the voltage level of said charging/discharging control signal;

a second switch for switching said charging/discharging control signal to said comparator by using said horizontal blanking signal; and a second charging/discharging element for performing charging/discharging according to the operation of said second switch and the level of voltage applied from said second comparator.

12. An image-correction circuit for a picture tube as claimed in claim 10, wherein said second pulse-width varying means comprises:

second comparison switching means for comparing the charging/discharging voltage level of said second charging/discharging means with that of said horizontal phase control signal, thereby switching the charging/discharging voltage according to the comparison result; and second oscillating means for varying the pulse width of said horizontal sync signal in proportion to the level of the charging/discharging voltage applied to the switching operation of said second comparison switching means.

13. In a picture tube apparatus for displaying images having horizontal output circuit means and vertical output circuit means for outputting respective horizontal and vertical output signals, said horizontal and vertical output signals being deflected by vertical and horizontal deflection yokes for forming a currently displayed image, an image-correction circuit for correcting said currently displayed image when said image has been displayed asymmetrically, said image-correction circuit comprising:

an input device for generating correction signals for transforming said currently displayed image from an uncorrected image that has been displayed asymmetrically to a corrected image in response to manipulation by a user;

system control means responsive to said correction signals generated from said input device for outputting previously stored vertical and horizontal asymmetric-correction data from a pin-balance memory means in the form of vertical and horizontal pin balance control signals, respectively, vertical pin balance correction means for correcting the signal output from said vertical output circuit means by said vertical pin balance control signal so that the output signal becomes symmetric vertically; and horizontal pin balance correction means for correcting the signal output from said horizontal output circuit means by said horizontal pin balance control signal so that the output signal becomes symmetrical horizontally, said system control means comprising:

a central processing unit for outputting an address signal corresponding to a correction signal from said input device and a self-oscillating clock signal of to a predetermined frequency;

a decoder for decoding said address signal by using the clock signal output from said central processing unit and a flyback pulse separated from the currently displayed image, said pin balance memory means outputting said vertical and horizontal pin balance control signals in correspondence with a decoded address signal output from said decoder, and a digital converter for converting said data output from said pin-balance memory means into an analog signal and outputting the result as said vertical and horizontal pin balance control signals.

14. In a picture tube apparatus for displaying images having horizontal output circuit means and vertical output circuit means for outputting respective horizontal and vertical output signals, said horizontal and vertical output signals being deflected by vertical and horizontal deflection yokes for forming a currently displayed image, an image-correction circuit for correcting said currently displayed image when said image has been displayed non-rectangularly, said image-correction circuit comprising:

an input device for generating correction signals for transforming said currently displayed image from an uncorrected image that has been displayed non-rectangularly to a corrected image in response to manipulation by a user;

system control means responsive to said correction signals generated from said input device for outputting previously stored vertical and horizontal non-parallel display correction data, from a pin cushion memory means in the form of vertical and horizontal pin cushion control signals, respectively, vertical pin cushion correction means for correcting the signal output from said vertical output circuit means by said vertical pin cushion control signal so that the output signal becomes parallel vertically; and horizontal pin cushion correction means for correcting the signal output from said horizontal output circuit means by said horizontal pin cushion control signal so that the output signal becomes parallel horizontally, said system control means comprising:

a central processing unit for outputting an address signal corresponding to a correction signal from said input device and a self-oscillating clock signal of a predetermined frequency;

a decoder for decoding said address signal by using the clock signal output from said central processing unit and a flyback pulse separated from the currently displayed image, said pin cushion memory means outputting said vertical and horizontal pin cushion control signals in correspondence with a decoded address signal output from said decoder, and a digital/analog converter for converting said data output from said pin cushion memory means into an analog signal and outputting the result as said vertical and horizontal pin cushion control signals.

15. A method for correcting a currently displayed image that appears vertically and horizontally asymmetric in a picture tube apparatus said picture tube apparatus including means for generating a flyback pulse associated with the currently displayed image, said method comprising the steps of:

setting a pin balance correction mode according to a correction signal input from an input control device being manipulated by a user, correcting the image displayed asymmetrical vertically by using data previously stored in a pin-balance memory means through the manipulation of said input control device, and correcting the image displayed asymmetrically horizontally by using said previously stored data through the manipulation of said input control device, said step of correcting the image displayed asymmetrically vertically comprising the substeps of:

outputting a signal input through the manipulation of said input control device as an address signal;

decoding the output address signal by using the flyback pulse of the currently displayed image;

reading out previously stored data corresponding to the decoded address signal from said pin-balance memory means, and converting the read data into an analog signal and outputting the result as a vertical balance control signal.

16. A method for correcting a currently displayed image that appears vertically and horizontally asymmetric in a picture tube apparatus said picture tube apparatus including means for generating a flyback pulse associated with the currently displayed image, said method comprising the steps of:

setting a pin balance correction mode according to a correction signal input from an input control device being manipulated by a user, correcting the image displayed asymmetrically vertically by using data previously stored in a pin-balance memory means through the manipulation of said input control device, and correcting the image displayed asymmetrically horizontally by using said previously stored data through the manipulation of said input control device, said step of correcting the image displayed asymmetrically horizontally comprising the substeps of:

outputting a signal input through the manipulation of said input control device as an address signal;

decoding the output address signal by using the flyback pulse of the currently displayed image;

reading out previously stored data corresponding to the decoded address signal from said pin-balance memory means; and converting the read data into an analog signal and outputting the result as a horizontal balance control signal.

17. An image-correction method for a picture tube for correcting an image displayed non-rectangularly by manipulating an input control device said method comprising the steps of:

setting a pin-cushion correction mode according to a signal input through the manipulation of said input control device;

correcting the image to become parallel vertically by using previously stored data from a pin cushion memory means through the manipulation of said input control device; and correcting the image to become parallel horizontally by using previously stored data through the manipulation of said input control device, said step of correcting the image to become parallel vertically comprising the substeps of:

outputting a signal input through the manipulation of said input control device as an address signal;

decoding the output address signal by using a flyback pulse of the currently displayed image;

reading out previously stored data, corresponding to the decoded address signal, from said pin-cushion memory means; and converting the read data into an analog signal and outputting the result as a vertical cushion control signal.

18. An image-correction method for a picture tube for correcting an image displayed non-rectangularly by manipulating an input control device, said method comprising the steps of:

setting a pin-cushion correction mode according to a signal input through the manipulation of said input control device;

correcting the image to become parallel vertically by using previously stored data through the manipulation of said input control device; and correcting the image to become parallel horizontally by using previously stored data from a pin-cushion memory means through the manipulation of said input control device, said step of correcting the image to become parallel horizontally comprising the substeps of:

outputting a signal input through the manipulation of said input control device as an address signal;

decoding the output address signal by using a flyback pulse of the currently displayed image;

reading out previously stored data, corresponding to the decoded address signal, from said pin-cushion memory means; and converting the read data into an analog signal and outputting the result as a horizontal cushion control signal.

19. In a picture tube apparatus having horizontal output circuit means and vertical output circuit means for outputting signals that are capable of forming a currently displayed image, an image-correction circuit for correcting said currently displayed image when it displayed asymmetrically or non-rectangularly in a vertical or horizontal direction, or, that is rotated in the vertical or horizontal direction, said image-correction circuit comprising:

an input device for generating correction signals capable of transforming said currently displayed image from an uncorrected image to a corrected image in response to manipulation by a user;

a system control device including:

i) first means responsive to a first set of correction signals generated from said input device for determining a degree of rotation for said currently displayed image for correcting the uncorrected image, and including means for processing vertical sync signals and horizontal sync signals of the currently displayed image to form and to output respective vertical and horizontal charging/discharging control signals and respective vertical and horizontal phase signals, each of the vertical and horizontal charging/discharging control signals and respective vertical and horizontal phase signals having voltage levels corresponding to the rotation degree, ii) second means responsive to a second set of correction signals generated from the input device for outputting previously stored vertical and horizontal asymmetric-correction data in the form of vertical and horizontal pin balance control signals, respectively, iii) third means responsive to a third set of correction signals generated from the input device for outputting previously stored vertical and horizontal non-parallel display correction data in the form of vertical and horizontal pin cushion control signals, respectively;

vertical phase control means responsive to the voltage levels of the vertical charging/discharging and vertical phase signals and to a vertical blanking signal separate from the uncorrected image for outputting a vertical phase control signal for correcting the uncorrected image in the vertical direction;

horizontal phase control means responsive to the voltage levels of horizontal charging/discharging and horizontal phase signals and to a horizontal blanking signal separate from the uncorrected image for outputting a horizontal phase control signal for correcting the uncorrected image in the horizontal direction;

vertical phase sync means responsive to said vertical phase control signal output from the vertical phase control means, a vertical output signal fedback from the vertical output circuit means, and the vertical sync signal of the currently displayed image, for shifting the image vertically to thereby correct the vertical position of the image;

horizontal phase sync means responsive to said horizontal phase control signal output from the horizontal phase control means, a horizontal output signal fedback from the horizontal output circuit means, and the horizontal sync signal of the currently displayed image, for shifting the image horizontally to thereby correct the horizontal position of the image;

vertical pin balance correction means for correcting the signal output from said vertical output circuit means by said vertical pin balance control signal so that the output signal becomes symmetric vertically;

horizontal pin balance correction means for correcting the signal output from said horizontal output circuit means by said horizontal pin balance control signal so that the output signal becomes symmetric horizontally;

vertical pin cushion correction means for correcting the signal output from said vertical output circuit means by said vertical pin cushion control signal so that the output signal becomes parallel vertically; and horizontal pin cushion correction means for correcting the signal output from said horizontal output circuit means by said horizontal pin balance control signal so that the output signal becomes parallel horizontally.

* * * * *